United States Patent
Zhou et al.

(10) Patent No.: US 7,936,843 B2
(45) Date of Patent: May 3, 2011

(54) SELF-ADAPTIVE MIMO TRANSMISSION/RECEPTION SYSTEM AND METHOD

(75) Inventors: Yong-Xing Zhou, Yongin-si (KR); Jianjun Li, Yonging-si (KR); Jae-Kwon Kim, Jeollanam-do (KR); Jiansong Gan, Beijing (CN); Jing Wang, Beijing (CN)

(73) Assignees: Samsung Electronics Co., Ltd. (KR); Tsinghua University (CN)

( * ) Notice: Subject to any disclaimer, the term of this patent is extended or adjusted under 35 U.S.C. 154(b) by 929 days.

(21) Appl. No.: 11/784,770

(22) Filed: Apr. 9, 2007

(65) Prior Publication Data
US 2007/0253507 A1 Nov. 1, 2007

(30) Foreign Application Priority Data

Apr. 7, 2006 (CN) .......................... 2006 1 0011613
Feb. 7, 2007 (KR) ....................... 10-2007-0012679

(51) Int. Cl.
*H04L 27/00* (2006.01)
(52) U.S. Cl. ........ 375/299; 375/267; 375/347; 370/334; 455/101
(58) Field of Classification Search ................... 375/267, 375/299, 347; 370/334; 455/101
See application file for complete search history.

(56) References Cited

U.S. PATENT DOCUMENTS

| | | | |
|---|---|---|---|
| 6,859,503 B2 * | 2/2005 | Pautler et al. | 375/299 |
| 7,308,047 B2 | 12/2007 | Sadowsky | |
| 7,483,493 B2 * | 1/2009 | Bar-Ness et al. | 375/267 |
| 2005/0141644 A1 | 6/2005 | Sadowsky | |
| 2005/0213686 A1 | 9/2005 | Love et al. | |
| 2006/0020434 A1 | 1/2006 | Sawai et al. | |

FOREIGN PATENT DOCUMENTS

| | | |
|---|---|---|
| JP | 2005-086781 | 3/2005 |
| KR | 1020060061508 | 6/2006 |
| WO | WO 2006/020434 | 2/2006 |

OTHER PUBLICATIONS

Ravi Narasimhan, "Spatial Multiplexing With Transmit Antenna and Constellation Selection for Correlated MIMO Fading Channels"; IEEE Transactions on Signal Processing; vol. 51; No. 11; Nov. 2003; pp. 2829-2838.

* cited by examiner

*Primary Examiner* — Ted M Wang
(74) *Attorney, Agent, or Firm* — The Farrell Law Firm, P.C.

(57) ABSTRACT

A self-adaptive multiple-input multiple-output (MIMO) transmission/reception system includes a transmitter provided with a serial-to-parallel converter, channel encoders, a plurality of constellation mappers, and transmission power controllers, and a receiver provided with a transmission scheme selection device, a zero forcing/minimum mean square error (ZF/MMSE) detector, reception power controllers, constellation demappers, channel decoders and a parallel-to-serial converter. The transmission scheme selection device generates information regarding plural sets of information to be used, a constellation mapping scheme and transmission power and transmits the generated information to the associated units of the transmitter and receiver, thereby controlling the number of sub code streams, the constellation mapping scheme and the transmission power. The system and method provide superior performance and require minimal feedback information.

7 Claims, 8 Drawing Sheets

SELF-ADAPTIVE MIMO TRANSMISSION/RECEPTION SYSTEM AND METHOD

PRIORITY

This application claims the benefit under 35 U.S.C. §119(a) of a Chinese Patent Application filed in the Chinese State Intellectual Property Office on Apr. 7, 2006 and assigned Serial No. 200610011613.0, and a Korean Patent Application filed in the Korean Intellectual Property Office on Feb. 7, 2007 and assigned Serial No. 2007-12679, the contents of both of which are incorporated herein by reference.

BACKGROUND OF THE INVENTION

1. Field of the Invention

The present invention relates generally to a self-adaptive Multiple-Input Multiple-Output (MIMO) technology using a channel fading correlation matrix, and more particularly to a self-adaptive MIMO transmission/reception system and method using an antenna set, a constellation size and transmission power in a MIMO transmission/reception system.

2. Description of the Related Art

MIMO technology is implemented to effectively improve fading channel capacity. Since a transmitter and receiver are provided with multiple antennas, respectively, MIMO technology is considered as an extension of dual-antenna diversity. However, MIMO technology effectively uses a code reuse technology and modulates a plurality of different data streams using the same channel and scrambling codes. This MIMO system controls channel fading using multiple antennas. Channel capacity linearly increases according to the number of antennas. In other words, radio channel capacity may be improved twice or more using MIMO channels and spectral efficiency may be improved twice or more without increasing bandwidth and antenna transmission power. To effectively separate sub data streams of the same spread spectrum code, a large interval between antennas is maintained, thereby preventing mutual interference between signals.

When MIMO technology is used, both channel capacity and channel reliability can be improved, and a bit error rate can be reduced. That is, the channel capacity can be improved using spatial reuse provided by MIMO channels, the reliability can be improved and the bit error rate can be reduced using spatial diversity provided by MIMO channels. To implement spatial reuse gain, a Bell Labs Layered Space Time (BLAST) algorithm, a Zero Forcing (ZF) algorithm and a Minimum Mean Square Error (MMSE) algorithm are mainly used. The BLAST algorithm has superior performance and low complexity, and uses the ZF algorithm and applies an interference cancellation technology to the ZF algorithm.

Diagonal-BLAST (D-BLAST) is a space-time technology and provides a system in which capacity linearly increases according to an increase of n when bandwidth and transmission power are fixed. This may improve spectral efficiency and may be widely applied in the future. When the number of receive antennas increases, the D-BLAST technology may reduce interference between channels, but computation may be complex.

To improve the performance of the BLAST system, a preceding technology has been adopted. However, the technology should feed back all correlation matrices to a transmitter. Antenna selection and antenna power and code rate control are performed. A conventional self-adaptive MIMO transmission/reception method maximizes the margin of a minimum Signal to Noise Ratio (SNR) by selecting an antenna set and a constellation mapping scheme. A system designed as described above uses the same constellation between transmit antennas and neglects a difference between the transmit antennas. When transmission power is considered, there are drawbacks in that the same power used for the transmit antennas may not be cost-effective and a full search should be performed for the antenna set.

When a data rate and a ZF receiver are fixed, a small number of transmit antennas may achieve high diversity order. However, a constellation size is large and a distance between constellations is small. A large number of transmit antennas may achieve low diversity order. However, a constellation size is small and a distance between constellations is large.

A Distributed Wireless Communication System (DWCS) should select a virtual cell for an arbitrary user. If the virtual cell for the user is formed in a state in which a large number of distributed antennas in uplink are selected, complexity and interference simultaneously increase. It is more important to set a virtual cell in downlink as compared with uplink. When a service is provided to an arbitrary user by selecting multiple antennas, low-quality antennas consume a relatively large amount of power. When a small number of antennas are selected, the degree of freedom of a channel is low, and therefore, high throughput is not implemented.

SUMMARY OF THE INVENTION

An aspect of the present invention is to address at least the above problems and/or disadvantages and to provide at least the advantages described below. Accordingly, an aspect of the present invention is to provide a method that can select transmit antennas with optimal transmission efficiency and can efficiently allocate transmission rates, while satisfying a target spectral efficiency and a target bit error rate.

An aspect of the present invention is to provide a transmission method for use in a self-adaptive MIMO system.

An aspect of the present invention is to provide a reception method for use in a self-adaptive MIMO system.

An aspect of the present invention is to provide an optimal self-adaptive transmission method for use in a receiver of a self-adaptive MIMO system.

An aspect of the present invention is to provide a simplified self-adaptive transmission method for use in a receiver of a self-adaptive MIMO system.

In accordance with an aspect of the present invention, there is provided a transmitter for use in a MIMO transmission/reception system, including a serial-to-parallel converter for converting an input original information bit stream into multiple parallel sub code streams according to plural sets of information, channel encoders for independently channel encoding the sub code streams, constellation mappers for constellation mapping the independently channel encoded streams according to constellation mapping scheme information and forming modulated data (or data code stream), and transmission power controllers for applying different power weights to the modulated data using an available transmission power and plural sets of information in the transmission system and transmitting the controlled modulated data via the antennas.

In accordance with an aspect of the present invention, there is provided a transmitter for use in a MIMO transmission/reception system, including a channel encoder, having one original information input terminal, for channel encoding an original information bit stream input through the input terminal, a serial-to-parallel converter for converting the encoded original information bit stream into multiple parallel sub code streams according to plural sets of information, constellation mappers for constellation mapping the sub code streams according to constellation mapping scheme information and forming modulated data, and transmission power controllers for applying different power weights to the formed modulated data according to transmission power information and transmitting the modulated data to a receiver via antennas.

In accordance with an aspect of the present invention, there is provided a receiver for use in a MIMO transmission/reception system, including a transmission scheme selection device for generating plural sets of information, constellation mapping information and transmission power information when pilot carriers are received from a transmitter, a detector for detecting target signals received via receive antennas using the generated plural sets of information and generating multiple modulated data, reception power controllers for applying power weights to the modulated data according to reception power information mapped to the generated transmission power information and controlling powers of the modulated data, constellation demappers for demapping the power-controlled modulated data and generating sub code streams, channel decoders for independently channel decoding the generated sub code streams, and a parallel-to-serial converter for parallel-to-serial converting the decoded streams output from the channel decoders into an information bit stream.

In accordance with an aspect of the present invention, there is provided a transmission method for use in a MIMO transmission/reception system, including distributing an input original information bit stream into multiple parallel sub code streams according to plural sets of information; independently channel encoding the distributed sub code streams, constellation mapping the independently channel encoded streams according to constellation mapping scheme information and forming modulated data, and applying different power weights to the formed modulated data according to transmission power information and transmitting the modulated data to a receiver via antennas.

In accordance with an aspect of the present invention, there is provided a transmission method for use in a self-adaptive MIMO transmission/reception system, including channel encoding an original information bit stream input through one original information input terminal, distributing the encoded original information bit stream into multiple parallel sub code streams according to plural sets of information, constellation mapping the distributed sub code streams according to constellation mapping scheme information and forming modulated data, and applying different power weights to the formed modulated data according to transmission power information and transmitting the modulated data to a receiver via antennas.

In accordance with an aspect of the present invention, there is provided a reception method for use in a self-adaptive MIMO transmission/reception system, including selecting a transmission scheme by generating plural sets of information, constellation mapping information and transmission power information when pilot carriers are received from a transmitter, detecting target signals received via receive antennas using the generated plural sets of information and generating multiple modulated data, applying power weights to the modulated data according to reception power information mapped to the generated transmission power information and controlling powers of the modulated data, demapping the power-controlled modulated data and generating sub code streams, independently channel decoding the generated sub code streams, and parallel-to-serial converting the decoded streams output from channel decoders into an information bit stream.

In accordance with an aspect of the present invention, there is provided an optimal self-adaptive transmission method for use in a receiver of a MIMO system, including acquiring a matrix mapped to a transmit antenna set of a transmitter from receive antennas and receiving a target spectral efficiency (C) and a target Bit Error Rate ($BER_t$), computing total transmission powers (P) by combining a constellation size of each antenna and an antenna set for satisfying the received target spectral efficiency, searching for lowest transmission power from the computed transmission powers (P), and computing transmission power of each antenna and transmitting transmission power information to the transmitter.

In accordance with an aspect of the present invention, there is provided a simplified self-adaptive transmission method for use in a receiver of a MIMO system, including computing total transmission power ($P_m$) When the number of transmit antennas ($n_T$) of a transmitter is less than or equal to the number of receive antennas ($n_R$) of the receiver and comparing the computed total transmission power ($P_m$) with minimum transmission power ($P_{min}$), excluding a lowest-quality transmit antenna from a transmit antenna set when the total transmission power ($P_m$) is less than the minimum transmission power ($P_{min}$) and determining whether all transmit antennas are tested and the number of receive antennas ($n_R$) to be tested is zero, applying a size of a transmit antenna set to the transmit antennas of the transmitter, computing an inverse of a matrix mapped to antennas of the transmit antenna set, and selecting an antenna requiring minimal additional transmission power, and computing transmission power of the selected antenna.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of the preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Hereinafter, a self-adaptive MIMO transmission/reception system and method in accordance with the present invention will be described with reference to the accompanying drawings.

Figure 1A:
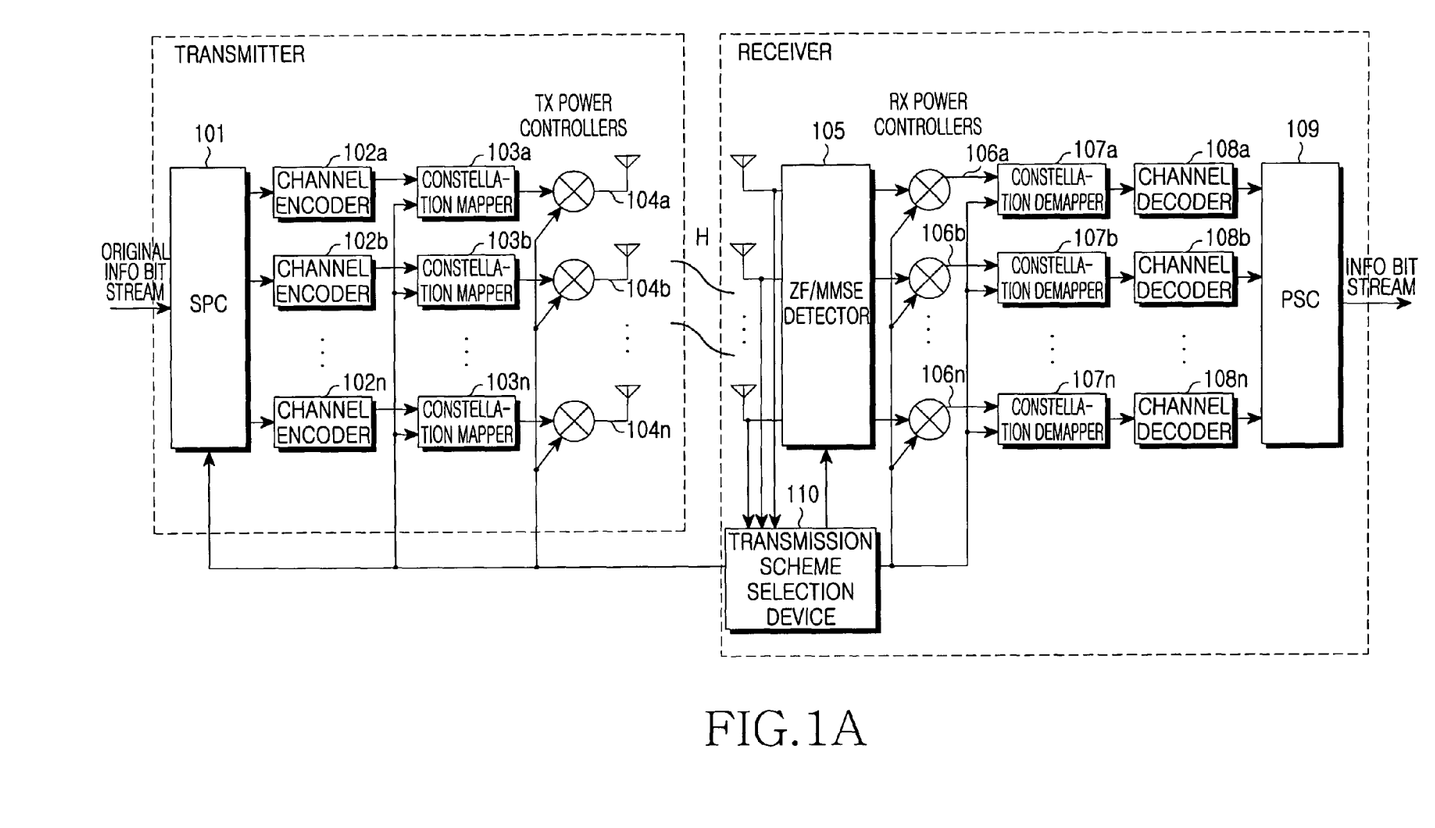
FIG. 1A illustrates a MIMO transmission/reception system applied to a BLAST system in accordance with a first embodiment of the present invention.

FIG. 1A illustrates a MIMO transmission/reception system applied to a BLAST system in accordance with a first embodiment of the present invention.

As illustrated in FIG. 1A, the MIMO transmission/reception system applied to the BLAST system in accordance with the present invention can be constructed with a transmitter (or transmitting end) and a receiver (or receiving end).

The transmitter is constructed with a Serial-to-Parallel Converter (SPC) 101, a plurality of channel encoders 102a, 102b, ..., 102n, a plurality of constellation mappers 103a, 103b, ..., 103n, a plurality of transmission (Tx) power controllers 104a, 104b, ..., 104n and transmit (Tx) antennas. The SPC 101 performs a process for serial-to-parallel converting (or distributing) an original information bit stream upon receiving the original information bit stream and outputs a plurality of parallel sub code streams. The channel encoders 102a, 102b, ..., 102n independently channel encode the sub code streams when receiving the sub code streams from the SPC 101. The constellation mappers 103a, 103b, ..., 103n form modulated data in a constellation mapping scheme after modulating the encoded streams received from the channel encoders 102a, 102b, ..., 102n. The transmission power controllers 104a, 104b, ..., 104n apply different power weights to the formed modulated data and output the power-controlled modulated data to the Tx antennas.

The receiver can be constructed with a transmission scheme selection device 110, a Zero Forcing/Minimum Mean Square Error (ZF/MMSE) detector (hereinafter detector) 105, a plurality of reception (Rx) power controllers 106a, 106b, ..., 106n, a plurality of constellation demappers 107a, 107b, ..., 107n, a plurality of channel decoders 108a, 108b, ..., 108n, and a Parallel-to-Serial Converter (PSC) 109. When pilot carriers are received via a plurality of receive (Rx) antennas, the transmission scheme selection device 110 detects the received pilot carriers and generates information regarding an antenna set to be used, a constellation mapping scheme and transmission power. The detector 105 detects target signals received via the Rx antennas using the information regarding the antenna set to be used that is received from the transmission scheme selection device 110 and generates a plurality of modulated data. The reception power controllers 106a, 106b, ..., 106n apply different power weights to the received modulated data on the basis of reception power information mapped to the transmission power information from the transmission scheme selection device 110 and control powers of the received modulated data. The constellation demappers 107a, 107b, ..., 107n generate a plurality of sub code streams by constellation demapping the power-controlled modulated data. The channel decoders 108a, 108b, ..., 108n independently channel decode the sub code streams. The PSC 109 converts the streams decoded by the channel decoders 108a, 108b, ..., 108n into an information bit stream.

Next, an operation of the MIMO transmission/reception system applied to the BLAST system in accordance with a first embodiment of the present invention will be described with reference to FIG. 1A.

When an original information bit stream is received, the SPC 101 converts the received original information bit stream into a plurality of parallel sub code streams and outputs the parallel sub code streams to the channel encoders 102a, 102b, ..., 102n. That is, each channel encoder receives one sub code stream from the SPC 101, and independently channel encodes the received sub code stream and outputs the channel encoded stream to a constellation mapper linked thereto. The constellation mappers 103a, 103b, ..., 103n perform constellation mapping processes for encoded streams using constellation mapping scheme information received from the transmission scheme selection device 110 and generate modulated data after performing a modulation process. When the modulated data are generated, the transmission power controllers 104a, 104b, ..., 104n apply different power weights to the generated modulated data using transmission power information received from the transmission scheme selection device 110 and transmit the modulated data to the receiver via the multiple antennas.

When the receiver provided with the multiple antennas receives the streams transmitted from the transmitter, the transmission scheme selection device 110 detects pilot carriers via the antennas. When the pilot carriers are received, the transmission scheme selection device 110 extracts information regarding an antenna set to be used, a constellation mapping scheme and transmission power from the received pilot carriers. The transmission scheme selection device 110 transmits the extracted information to the detector 105, the reception power controllers 106a, 106b, ..., 106n and the constellation demappers 107a, 107b, 107n.

Moreover, the transmission scheme selection device 110 provides the associated units of the transmitter with the extracted information regarding the antenna set, the constellation mapping scheme and the transmission power information. The detector 105 detects target signals from streams received via the Rx antennas using the information received from the transmission scheme selection device 110. The detector 105 generates a plurality of modulated data and outputs the generated streams to the reception power controllers 106a, 106b, ..., 106n. The reception power controllers 106a, 106b, ..., 106n control signal power by applying different power weights to the received modulated data using the transmission power information received from the transmission scheme selection device 110. The power-controlled streams are output to the constellation demappers 107a, 107b, ..., 107n.

The constellation demappers 107a, 107b, ..., 107n perform constellation demapping processes for the modulated data received from the reception power controllers 106a, 106b, ..., 106n using the constellation mapping scheme information received from the transmission scheme selection device 110, thereby generating a plurality of sub code streams. The channel decoders 108a, 108b, ..., 108n channel decode the sub code streams received from the constellation demappers 107a, 107b, ..., 107n and output the decoded streams to the PSC 109. The PSC 109 converts the parallel sub code streams channel-decoded by the channel decoders 108a, 108b, ..., 108n into an information bit stream.

In FIG. 1A, the transmission scheme selection device 110 extracts pilot carriers from signals received via the antennas. Using the extracted pilot carriers, there are determined the antenna set to be used, the constellation mapping scheme, the transmission power, the constellation demapping scheme and the reception power.

Specifically, the transmission scheme selection device 110 feeds back the information regarding the antenna set to be used by the transmitter to the SPC 101 connected to the channel encoders. Moreover, the transmission scheme selection device 110 feeds back the constellation mapping scheme information to the constellation mappers 103a, 103b, . . . , 103n which perform a constellation mapping process for a channel encoded signal in an associated constellation mapping scheme, respectively. The transmission scheme selection device 110 feeds back the transmission power information to the transmission power controllers 104a, 104b, . . . , 104n which control signal transmission power of an antenna, respectively.

As illustrated in FIG. 1A, the number of channel encoders, the number of constellation mappers and the number of transmission power controllers are equal to the number of Tx antennas, respectively. Also, the number of reception power controllers, the number of constellation demappers and the number of channel decoders are equal to the number of Tx antennas, respectively.

Figure 1B:
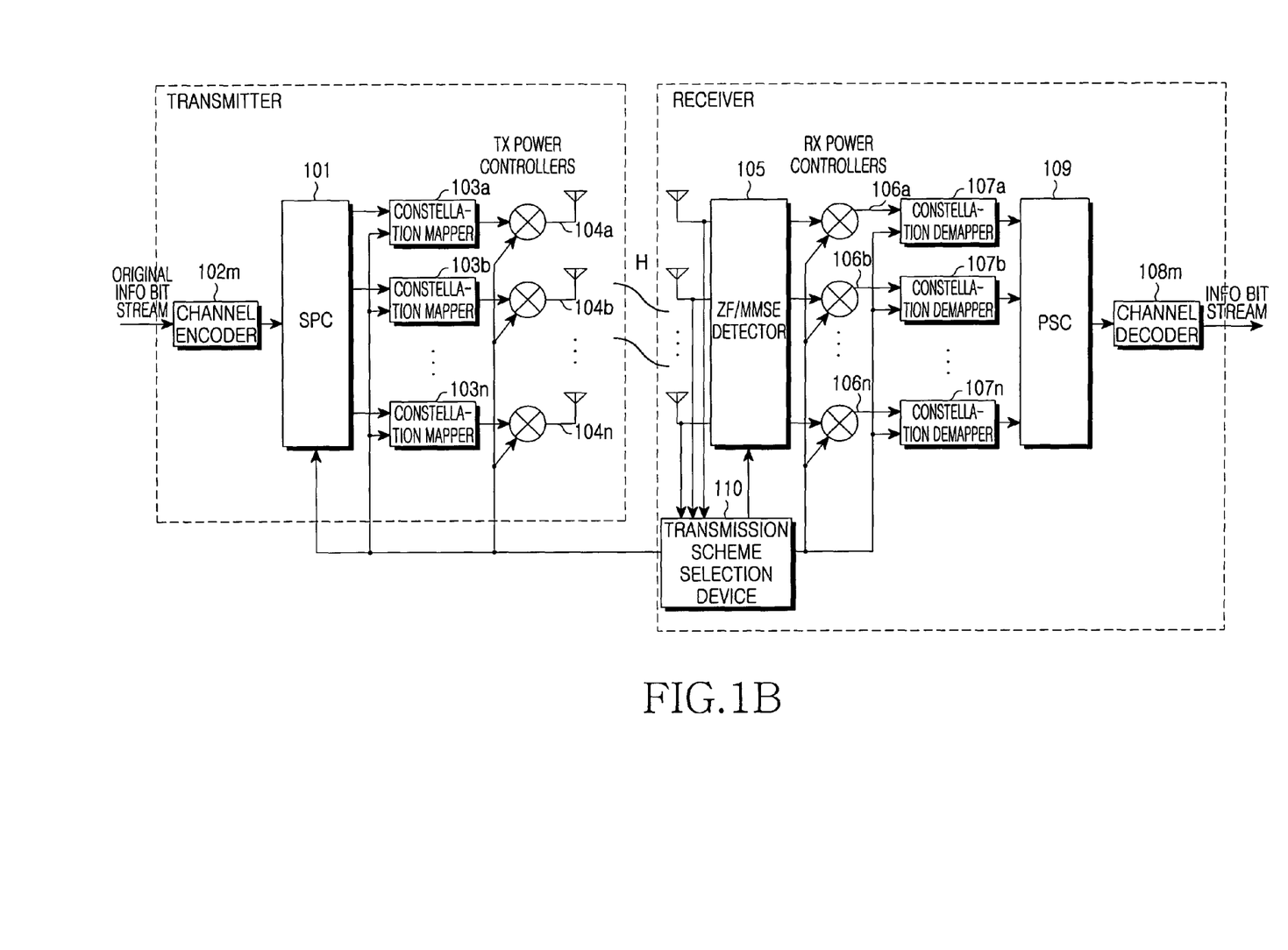
FIG. 1B illustrates a MIMO transmission/reception system applied to a BLAST system in accordance with a second embodiment of the present invention.

FIG. 1B illustrates a MIMO transmission/reception system applied to a BLAST system in accordance with a second embodiment of the present invention.

As illustrated in FIG. 1B, the MIMO transmission/reception system applied to the BLAST system in accordance with the second embodiment of the present invention is constructed with a transmitter and a receiver.

As a channel encoder 102m is arranged before an SPC 101, the channel encoder 102m encodes a received original information bit stream and then outputs the encoded stream to the SPC 101.

That is, the channel encoder 102m of the transmitter performs a joint channel encoding process for the received original information bit stream, extracts an encoded stream and outputs the extracted stream to the SPC 101. After encoding, the SPC 101 performs a process for serial-to-parallel converting the stream and forms a plurality of parallel sub code streams. The sub code streams are output to constellation mappers 103a, 103b, 103n.

In the receiver, a PSC 109 performs a process for parallel-to-serial converting sub streams received from constellation demappers 107a, 107b, . . . , 107n. For joint channel decoding, a serial stream is output to a channel decoder 108m. The channel decoder 108m channel decodes a received joint stream and extracts received information bits.

In the MIMO transmission/reception system applied to the BLAST system of the present invention compared to a traditional non-self-adaptive BLAST structure, information bits to be transmitted use a unified constellation mapping scheme and transmission power after encoding. The number of Tx antennas is fixed. Thus, the system controls the number sub code streams, the constellation mapping scheme and the transmission power.

Figure 2A:
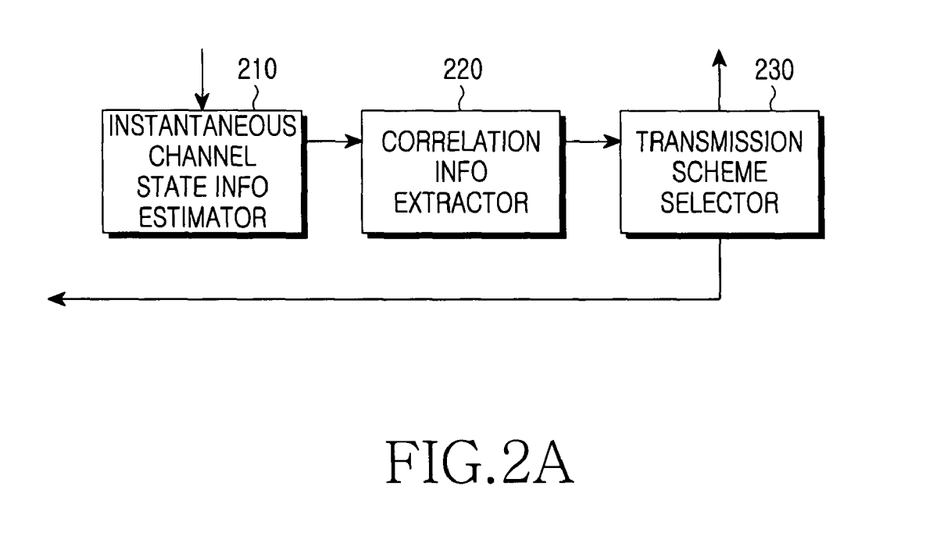
FIG. 2A illustrates a transmission scheme selection device in accordance with the present invention.

FIG. 2A illustrates the transmission scheme selection device in accordance with the present invention.

As illustrated in FIG. 2A, the transmission scheme selection device in accordance with the present invention is constructed with an instantaneous channel state information estimator 210, a correlation information extractor 220 and a transmission scheme selector 230.

The instantaneous channel state information estimator 210 extracts pilot carriers from signals received via antennas and acquires instantaneous channel state information. The correlation information extractor 220 receives the instantaneous channel state information from the instantaneous channel state information estimator 210 and generates channel fading correlation information (for example, $R_T$). When the channel fading correlation information is received, the transmission scheme selector 230 determines information regarding a Tx antenna set, a constellation size of each antenna (that is, a mapping scheme of each constellation mapper) and transmission power.

The information is fed back to the SPC 101, the constellation mappers 103a, 103b, . . . , 103n and the transmission power controllers 104a, 104b, . . . , 104n of the transmitter. Simultaneously, the transmission scheme selector 230 determines reception power information and demapping scheme information of each constellation demapper that are mapped to transmission power information and mapping scheme information of each constellation mapper. The Tx plural sets of information, the demapping scheme information and the reception power information are output to the ZF/MMSE detector 105, the constellation demappers 107a, 107b, . . . , 107n and the reception power controllers 106a, 106b, . . . , 106n.

Figure 2B:
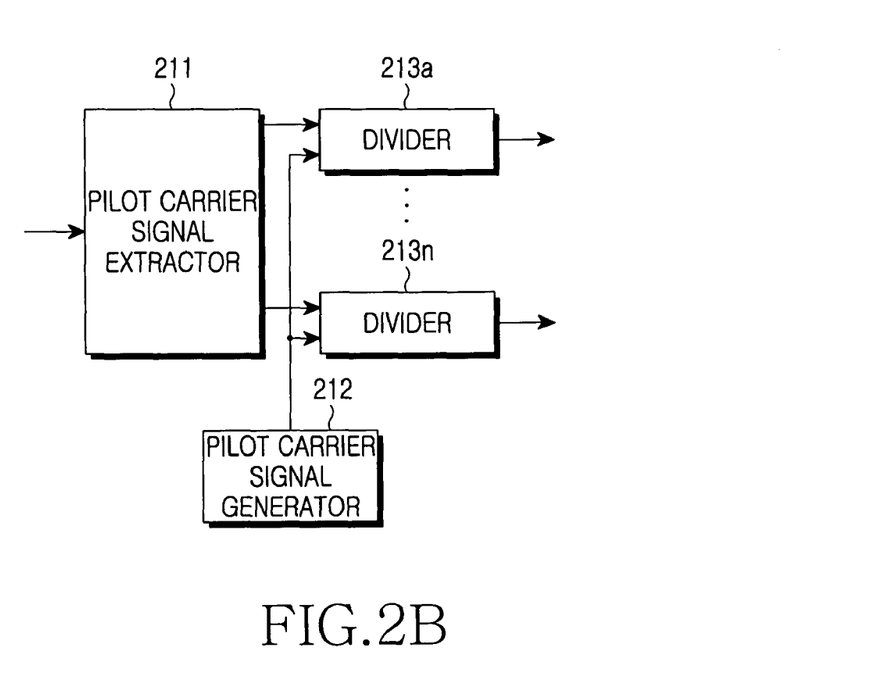
FIG. 2B illustrates an instantaneous channel state information estimator provided in the transmission scheme selection device in accordance with the present invention.

FIG. 2B illustrates the instantaneous channel state information estimator 210 provided in the transmission scheme selection device in accordance with the present invention.

As illustrated in FIG. 2B, the instantaneous channel state information estimator 210 is constructed with a pilot carrier signal extractor 211, a pilot carrier signal generator 212 and dividers 213a, . . . , 213n.

The number of dividers is a square of the number of transmitter antennas. The pilot carrier signal extractor 211 extracts received pilot carrier signals through a pilot carrier structure of the transmitter. The pilot carrier signal generator 212 generates the same pilot carrier signals as the transmitter. The dividers 213a, . . . , 213n receive the received pilot carrier signals and the pilot carrier signals generated by the pilot carrier signal generator 212 and perform division operations on the signals. In addition, instantaneous channel state signals of the pilot carrier positions are extracted.

Figure 2C:
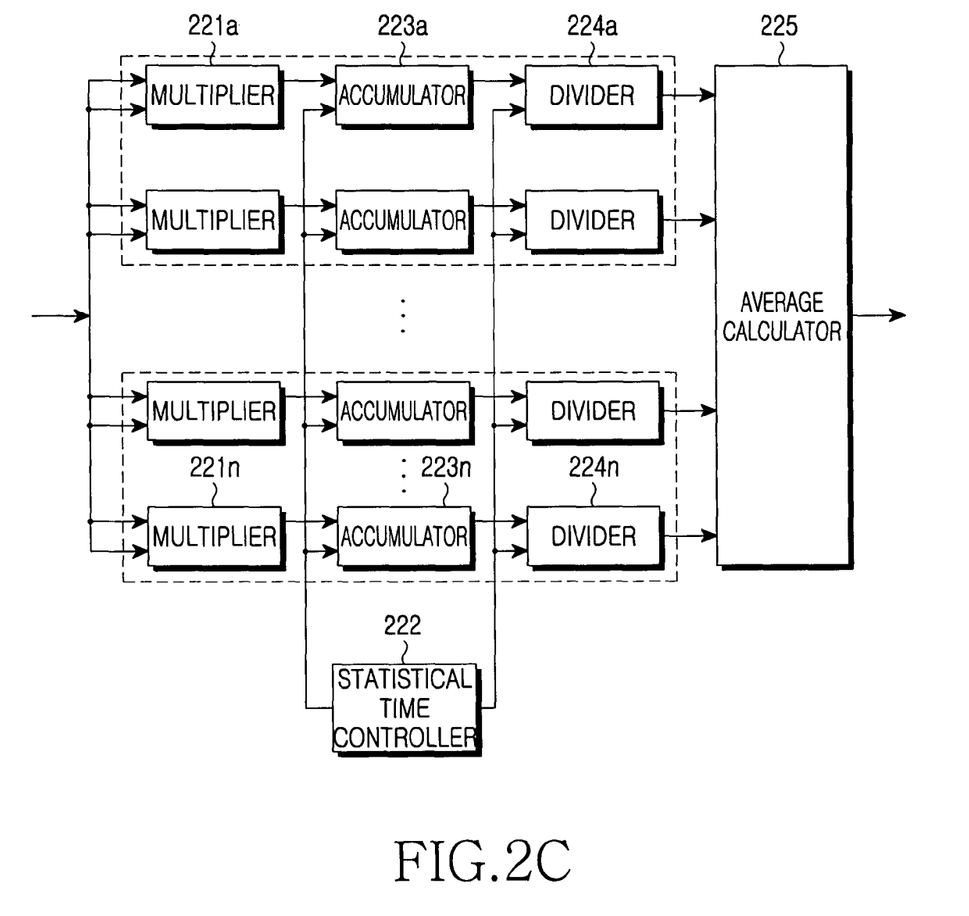
FIG. 2C illustrates a correlation information extractor provided in the transmission scheme selection device in accordance with the present invention.

FIG. 2C illustrates the correlation information extractor 220 provided in the transmission scheme selection device in accordance with the present invention.

As illustrated in FIG. 2C, the correlation information extractor 220 is constructed with multipliers 221a, . . . , 221n, a statistical time controller 222, accumulators 223a, . . . , 223n, dividers 224a, . . . , 224n and an average calculator 225. The number of multipliers, accumulators or dividers is the product of the number of Rx antennas and a square of the number of transmitter antennas.

The multipliers 221a, . . . , 221n multiply all instantaneous channel state information elements belonging to one antenna, respectively, and output numerical values obtained by multiplication to the accumulators 223a, . . . , 223n. The statistical time controller 222 controls accumulation times. Accumulation results are output to the dividers 224a, . . . , 224n which perform division operations on the accumulation results and the accumulation times. Consequently, temporal average values are computed. All the average values are output to the average calculator 225 which averages the temporal average values of the different Rx antennas and computes correlation information of Tx antennas.

The operation principle of the self-adaptive transmission scheme is now described prior to description of a process for determining the information in the transmission scheme selector 230.

Downlink of a flat fading MIMO system of $n_T$ Tx antennas and $n_R$ Rx antennas is considered. Since the number of scattering objects around antennas of a base station is small, it is difficult to satisfy the condition of rich scattering. For this reason, a fading model of the Tx antennas has spatial correlation. When a large number of scattering objects are present around a mobile station, the condition of rich scattering can be easily satisfied. Thus, a signal model can be expressed as shown in Equation (1).

$$r = HS + n = H_w R_T^{1/2} s + n \qquad (1)$$

Herein, r is an $(n_R*1)$ received signal vector. $H_w$ is an $(n_R*n_T)$ channel matrix and its element is independent and depends upon a CN(0, 1) distribution. $R_T$ is a channel fading correlation matrix of Tx antennas and s is $(n_T*1)$ transmitted signal vector. When a spatial reuse structure is considered, each weight of s is independent. In relation to a channel fading correlation matrix $R_s$ of Rx antennas, $E[ss^H]=\text{diag}(p_1, p_2, \ldots, p_{n_T})$, where $p_i$ is transmission power of an i-th antenna and a condition of $$\sum_{i=1}^{n_T} p_i = P$$

is satisfied. P is total transmission power. n is an $(n_R*1)$ complex Gaussian white noise vector and its element depends upon a $CN(0, N_0)$ distribution.

The spatial correlation of antenna fading degrades MIMO system performance. The present invention reduces the effect of spatial correlation to the system performance by self-adaptively selecting transmission mode on the basis of the channel correlation matrix $R_T$. When $R_T$ is determined, an average BER of each sub code stream of the system is reused through derivation and optimization. Assuming that the target spectral efficiency and the target bit error rate performance desired by the user are satisfied, total transmission power is minimized by extracting a self-adaptive transmission scheme and selecting a Tx antenna set and a transmission rate and transmission power on each antenna.

The optimal self-adaptive transmission method of the present invention has relatively high precision by computing minimum transmission power using an exhaustive search.

The present invention relates to a technology for employing ZF detection in a receiver and derives an optimal self-adaptive transmission criterion on the basis of a channel fading correlation matrix. As will be seen from the following simulations, the criterion is also applicable to MMSE detection. The receiver acquires a spatial correlation matrix $R_T$ of Tx antenna fading. In the present invention, the self-adaptive transmission criterion determines optimal transmission mode on the basis of $R_T$. Information regarding the optimal transmission mode is fed back to the transmitter, which transmits on the basis of the fed-back information. Thus, the transmitter requires only a selected antenna set, such that the self-adaptive transmission is performed with a constellation size and transmission power on each antenna.

When the ZF detection is adopted, an SNR after processing an i-th sub code stream has a $\chi^2$ distribution with $2(n_R-n_T+1)$ degrees of freedom weighted using one $[R_T^{-1}]_{ii}$ and its probability density function is expressed as shown in Equation (2).

$$f(\gamma_i) = \frac{[R_T^{-1}]_{ii} e^{-[R_T^{-1}]_{ii} \gamma_i N_0/p_i}}{(n_R - n_T)! p_i/N_0} \cdot \qquad (2)$$

-continued $$\left( \frac{\gamma_i [R_T^{-1}]_{ii} N_0}{p_i} \right)^{n_R - n_T}, \gamma \geq 0$$

In Equation (2), $p_i$ is transmission power of an i-th antenna and $\gamma_i$ is an SNR after an i-th sub code stream is processed. $N_0$ is noise power, $n_R$ is the number of Rx antennas, and $n_T$ is the number of active Tx antennas.

When a modulation scheme of Quadrature Amplitude Modulation (QAM) is used, an upper bound of a symbol error rate of an i-th path can be expressed as shown in Equation (3).

$$p_{sei} < 4\left(1 - \frac{1}{\sqrt{M_i}}\right) e^{-\frac{3}{2(M_i-1)} \gamma_i} \qquad (3)$$

In Equation (3), $M_i$ is the number of constellation points in the modulation scheme. On the basis of a distribution of $\gamma_i$, an expected value of $P_{sei}$ can be expressed as shown Equation (4).

$$\overline{P_{sei}} \leq \frac{4\left(1 - \frac{1}{\sqrt{M_i}}\right)}{\left[1 + \frac{3 p_i}{2(M_i - 1)[R_T^{-1}]_{ii} N_0}\right]^{n_R - n_T + 1}} \qquad (4)$$

If bit-to-symbol mapping uses Gray mapping, an average BER of the i-th sub code stream can be approximated as shown in Equation (5) when $2 \leq \log_2(M_i) \leq 8$ and $10^{-5} \leq \overline{P_{bei}} \leq 10^{-2}$.

$$\overline{P_{bei}} \approx \frac{0.1}{\left[1 + \frac{3 p_i}{2(M_i - 1)[R_T^{-1}]_{ii} N_0}\right]^{n_R - n_T + 1}} \qquad (5)$$

To satisfy a target bit error rate $BER_t$, the transmission power of the i-th antenna can be expressed as shown in Equation (6).

$$p_i = \frac{2}{3} N_0 \left( \left( \frac{0.1}{BER_t} \right)^{\frac{1}{n_R - n_T + 1}} - 1 \right) (M_i - 1)[R_T^{-1}]_{ii}, \qquad (6)$$

where $i = 1, 2, \cdots, n_T$

When the spectral efficiency desired by the user is denoted by C, $$\sum_{i=1}^{n_T} \log_2 M_i = C.$$

To reach the requirement of the spectral efficiency desired by the user, the total transmission power can be computed as shown in Equation (7).

$$P = \frac{2}{3}N_0\left(\left(\frac{0.1}{BER_t}\right)^{\frac{1}{n_R-n_T+1}} - 1\right)\sum_{i=1}^{n_T}(M_i - 1)[R_T^{-1}]_{ii} \quad (7)$$

In Equation (7), $N_0$ is noise power, $n_R$ is the number of Rx antennas, $n_T$ is the number of active Tx antennas, $R_T$ is a channel fading correlation matrix of the Tx antennas, and $M_i$ is the number of constellation points, where $i=1, 2, \ldots, n_T$.

Thus, when the target spectral efficiency C and the target bit error rate $BER_t$ of the user are decided, the optimal transmission scheme uses all Rx antennas and selects a Tx antenna set and a modulation scheme on each antenna, thereby minimizing the right-hand side of Equation (8) as described below.

Simplified self-adaptive transmission method in accordance with the present invention.

Minimum transmission power is achieved by implementing the above-described self-adaptive transmission method through an exhaustive search. However, an inverse of a channel correlation matrix should be first computed with respect to all possible Tx antenna sets. Then, all possible transmission rate allocation schemes should be verified to minimize the transmission power.

To reduce the number of antenna sets to be verified, a sequential reduction verification method is used. In this case, all antennas do not need to be verified. First, minimum transmission power achievable using all Tx antennas is verified, one antenna with the lowest performance is excluded from the verified antennas, and verification is again performed. This method is sequentially performed. From Equation (6), it can be seen that the performance of a sub code stream is degraded as $[R_T^{-1}]_{ii}$ increases. This should be removed as early as possible.

To reduce complexity due to transmission rate allocation, a continuous constellation approximation method is used. A code rate is not allocated to every antenna combination. A lower bound is computed by Equation (8).

$$P \geq P_m = \frac{2}{3}N_0\left(\left(\frac{0.1}{BER_t}\right)^{\frac{1}{n_R-n_T+1}} - 1\right) \cdot \left(n_T \sqrt[n_T]{2^C \prod_{i=1}^{n_T}[R_T^{-1}]_{ii}} - \sum_{i=1}^{n_T}[R_T^{-1}]_{ii}\right) \quad (8)$$

In Equation (8), $P_m$ is lower-bound transmission power.

If $M_i[R_T^{-1}]_{ii}$ is identical where $i=1, 2, \ldots, n_T$, Equation (8) includes the equal sign. Thus, Equation (8) is computed without actually allocating a code rate to an antenna set to be verified.

When $n_A$ denotes the total number of available antennas, the simplified method is as follows.

1) Antenna Set Selection $TS = \{1, 2, \ldots, n_A\}$, $P_{min} = \infty$, $S = NULL$ For $n_T = n_A \sim 1$ $R_T^{-1} = inv(R_{TS})$ IF $n_T \leq n_R$, $P_m$ is computed by Equation (8).

IF $P_m < P_{min}$, $P_m = P_{min}$, $S = TS$ END

END $k = \arg\max_{i \in TS}([R_T^{-1}]_{ii})$, $TS = TS - k$

END

TS is a total set of selectable Tx antennas and $P_{min}$ is minimum transmission power. $R_{TS}$ is a correlation matrix of an associated Tx antenna set and k is a variable. $n_A$ is the total number of selectable antennas and S is an intermediate storage variable.

2) Actual Transmission Rate and Power Allocation $n_T = size(S)$, $b = zeros(1, n_T)$, $R_T^{-1} = inv(R_s)$ FOR $l = 1 \sim C$ $k = \arg\min_i((2^{b_i+1} - 2^{b_i})[R_T^{-1}]_{ii}$ $b_k = b_k + 1$

END

FOR $i = 1 \sim n_T$

The transmission power $p_i$ of the $i$-th antenna is computed by Equation (6).

END

Herein, $n_T$ is the number of Tx antennas and b is a constellation size on each antenna. $b_k$ is a constellation size on a k-th antenna and l is the number of currently allocated information bits.

When actual transmission rate allocation is performed in a process for computing the total transmission power, a transmission rate is sequentially allocated to each antenna according to bits. Bits to be allocated every time are allocated to an antenna requiring minimal additional transmission power.

Figure 3:
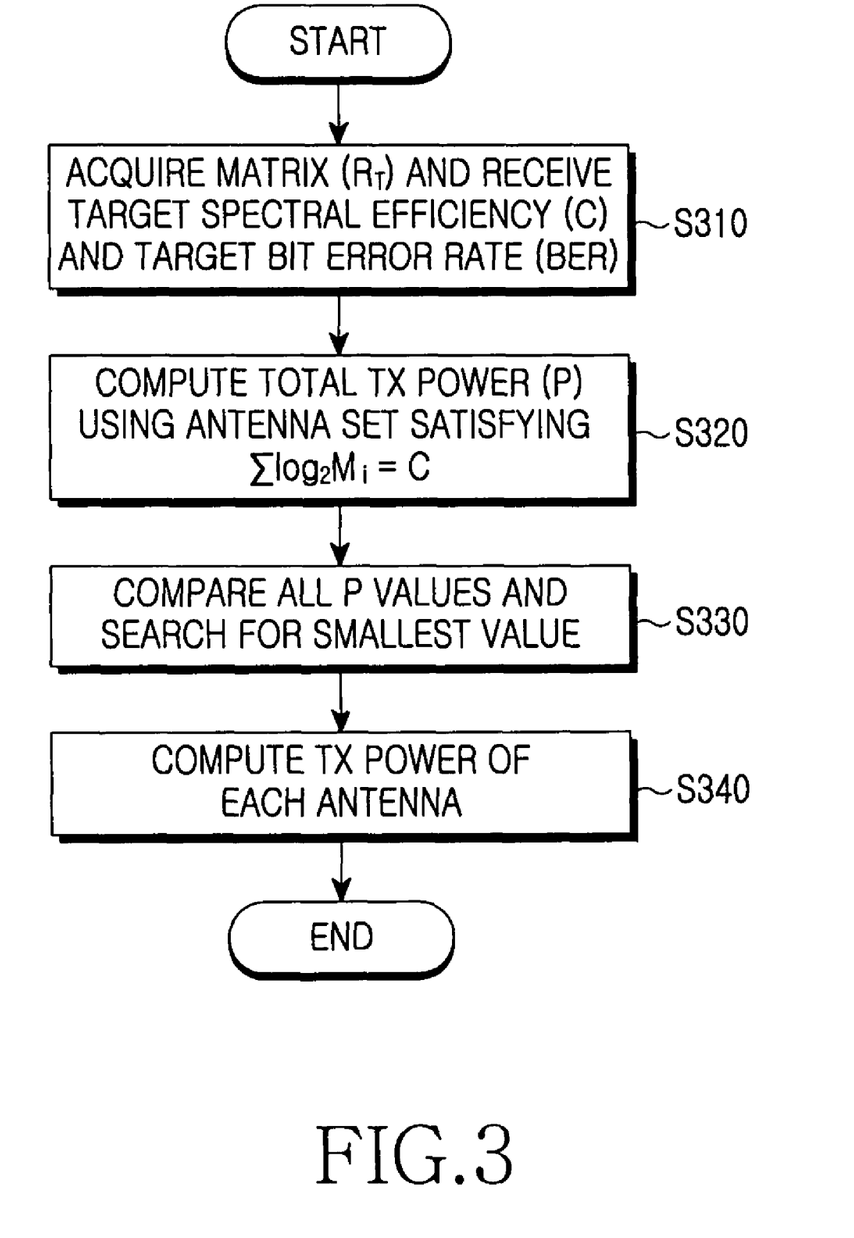
FIG. 3 illustrates an optimal self-adaptive transmission method in accordance with the present invention.

FIG. 3 illustrates the optimal self-adaptive transmission method in accordance with the present invention.

As illustrated in FIG. 3, the transmission scheme selector 230 acquires a correlation matrix $R_T$ on the basis of a set T of all available Tx antennas and receives a target spectral efficiency C and a target bit error rate $BER_t$ in step S310. Then, total transmission power P is computed by Equation (7) with respect to a combination of each antenna constellation size and an antenna set satisfying $\Sigma \log_2 M_i = C$ in step S320. The transmission scheme selector 230 compares all P values and searches for the smallest value from all the P values in step S330. An antenna set and a constellation size mapped to the searched value are necessary. In step S340, the transmission power of each antenna is computed by Equation (6).

The optimal self-adaptive transmission method of the present invention has relatively high precision by computing minimum transmission power using an exhaustive search.

Figure 4A:
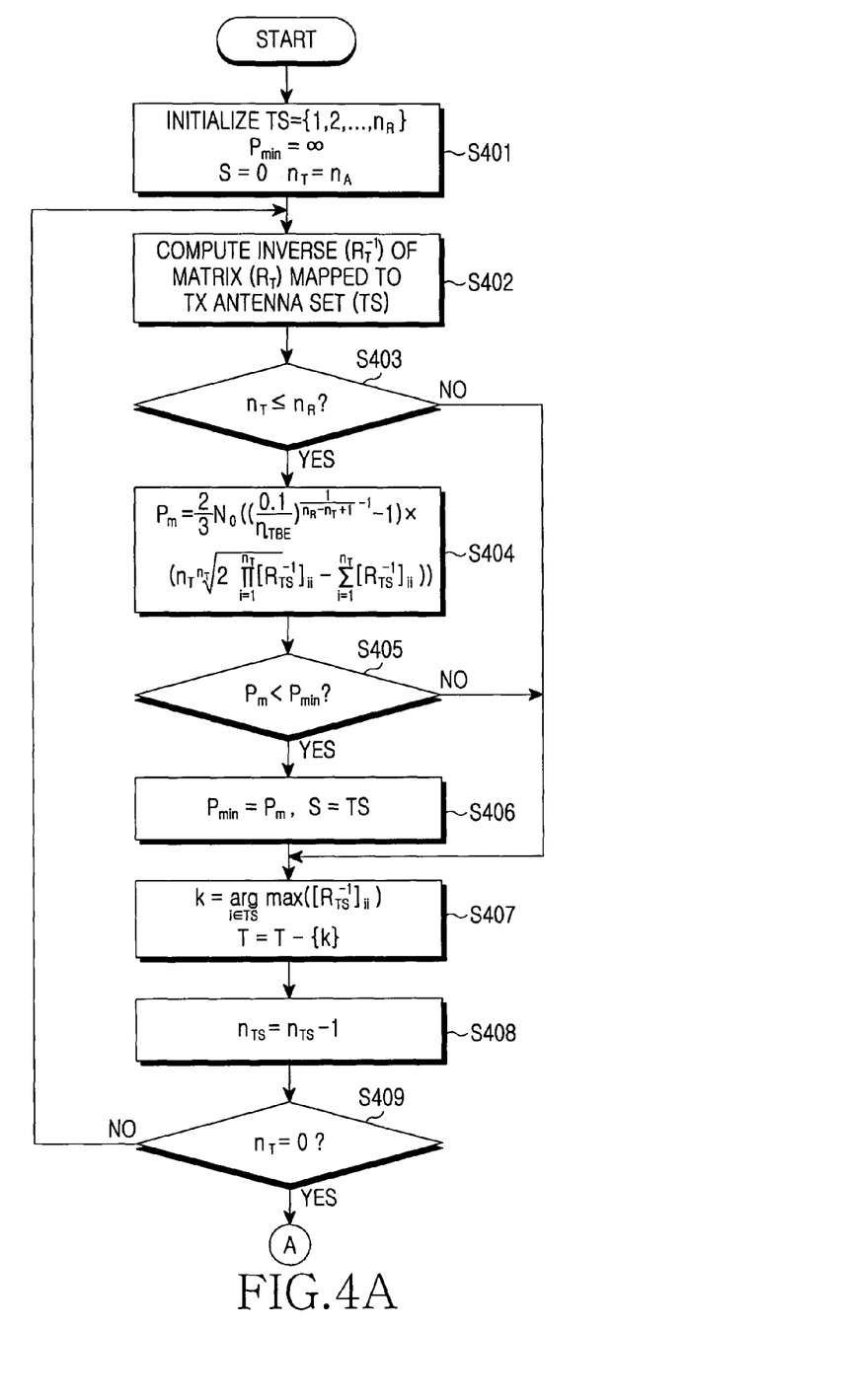
FIGS. 4A and 4B illustrate a simplified self-adaptive transmission method in accordance with the present invention.
Figure 4B:
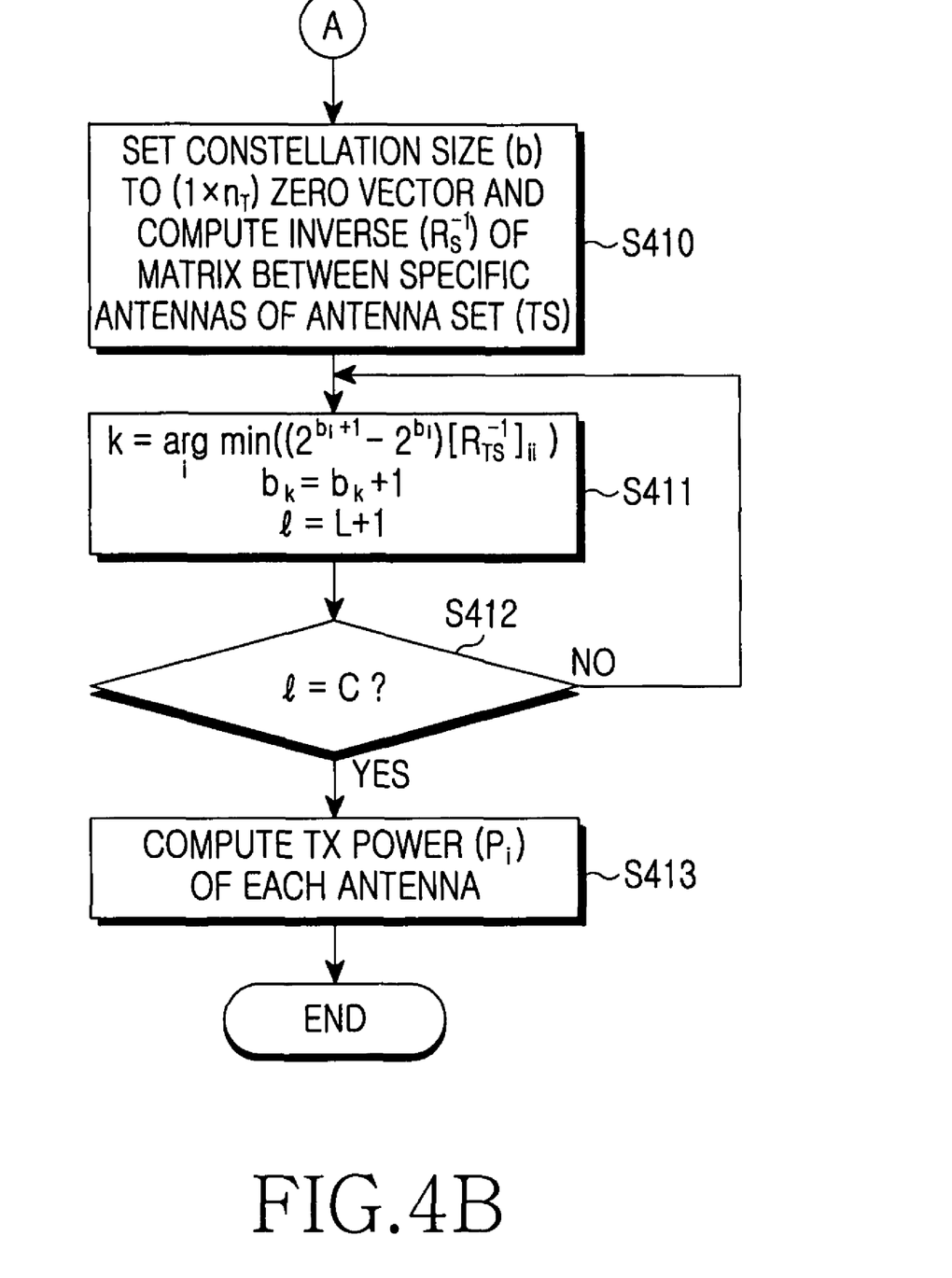

FIGS. 4A and 4B illustrate the simplified self-adaptive transmission method in accordance with the present invention.

In step S401, the transmission scheme selector 230 initializes a total set TS of selectable antennas, minimum transmission power $P_{min}$, an intermediate storage variable S, and the total number of selectable antennas, $n_A$. That is, TS={1, 2, ..., $n_A$}, $P_{min}=\infty$, S=NULL, and $n_T=n_A$. In step S402, the transmission scheme selector 230 computes an inverse $R_T^{-1}$ of a matrix $R_T$ mapped to the Tx antenna set received from the specific extractor 220. In step S403, it is determined whether the number of Tx antennas, $n_T$ is equal to or less than the number of Rx antennas, $n_R$. If $n_T \leq n_R$, a lower bound of the total transmission power, $P_m$, is computed on the basis of Equation (8) in step S404.

In step S405, it is determined whether the lower-bound transmission power $P_m$ is less than the minimum transmission power $P_{min}$. Upon determining that $P_m < P_{min}$, the minimum transmission power is updated to $P_m$ and the intermediate storage variable S is updated to TS in step S406. In step S407, a Tx antenna with the lowest quality is excluded from the antenna set on the basis of $$k = \arg\max_{i \in TS}([R_T^{-1}]_{ii}), \; TS = TS - k.$$

If $n_T > n_R$ in step S403, step S407 is performed.

Similarly, step S407 is performed if $P_m \geq P_{min}$ in step S405. Then, $n_T$ is incremented in step S408. In step S409, it is determined whether all Tx antennas have been tested or detected. That is, it is determined whether $n_T=0$. Upon determining that all the Tx antennas have not been tested, step S402 is performed. If $n_T=0$, step S410 is performed. In step S410, antenna set (S) size assignment is applied to $n_T$, and a constellation size b of each antenna is set to a (1*$n_T$) zero vector. The vector is stored in the constellation size of each antenna. An inverse $R_S^{-1}$ of a correlation matrix $R_S$ between antennas of an antenna set TS is computed. The number of currently allocated information bits, l, is set to 0.

Then, in step S411, an antenna requiring minimal additional transmission power is selected on the basis of $$k = \arg\min_{i}((2^{b_i+1} - 2^{b_i})[R_T^{-1}]_{ii})$$

and the constellation size of the antenna and the number of currently allocated information bits, l, are added to 1, respectively. In step S412, it is determined whether the number of currently allocated information bits, l, reaches the target spectral efficiency C. Upon determining that the number of currently allocated information bits, l, reaches the target spectral efficiency C, power of each Tx antenna is computed by Equation (6) in step S413. At this time, $M_i=2^{b_i}$. Upon determining that the number of currently allocated information bits, l, does not reach the target spectral efficiency C, step S411 is performed to continuously allocate unallocated information bits.

Through the above-described process, the antenna set TS, the stored $b_k$ value of the constellation mapping scheme of each Tx antenna and the transmission power $p_i$ of each antenna are determined. As described above, the simplified self-adaptive transmission method of the present invention easily implements an actual system by reducing the number of searches and a search time.

The performance of the MIMO transmission/reception system applied to the BLAST system of the present invention has been simulated. A non-coding system with six Tx antennas and six Rx antennas has been considered. For convenience of explanation, there are used parameters of Scene II disclosed in Narasimhan's article entitled "Spatial multiplexing with transmit antenna and constellation selection for correlated MIMO fading Channels" (IEEE transactions on signal procession, 2003, 51(11): 2829-2838). The performance of the system using the optimal self-adaptive method has been first simulated and the degree of approach between simplified algorithm performance and optimal criterion performance has been examined. In the simulations, the target spectral efficiency of the user is 12 bit/s/Hz.

Figure 5:
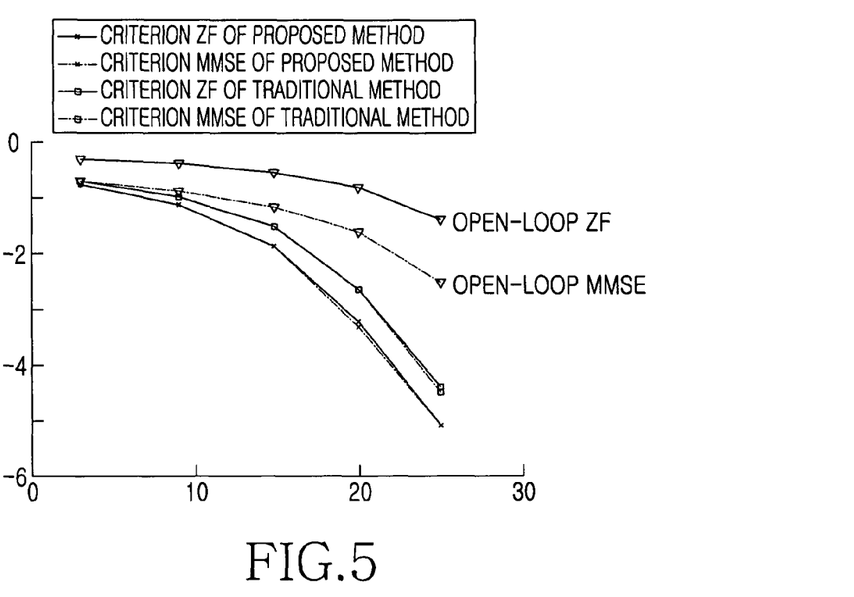
FIG. 5 illustrates an example of system performance when the optimal self-adaptive method is used in accordance with the present invention.

FIG. 5 illustrates an example of system performance when the optimal self-adaptive method is used in accordance with the present invention.

Specifically, FIG. 5 illustrates an example of a performance comparison between the Narasimhan method and an open-loop BLAST method. In the simulations, a target bit error rate is $10^{-3}$. The open-loop BLAST structure selects and uses all the six Tx antennas for which Quadrature Phase Shift Keying (QPSK) modulation and the same transmission power are used. The Narasimhan method selects two antennas 1 and 2 for which 64-point Quadrature Amplitude Modulation (64QAM) and the same transmission power are used.

The optimal method of the present invention selects three antennas 1, 2 and 6 for which 16QAM and different transmission powers are used. As seen from simulation results, the optimal method of the present invention has an SNR gain of more than 10 dB when the adopted ZF or MMSE detection is compared to an open-loop transmission without self-adaptation. When the method of the present invention is compared with the Narasimhan method, the optimal method of the present invention has a gain of 2 dB.

Although the optimal method of the present invention has been derived on the basis of a ZF receiver, the present invention has superior performance also in MMSE detection because ZF has lower-bound performance of the MMSE detection. In addition, when an SNR is high, the ZF detection performance approaches that of the MMSE detection.

Figure 6:
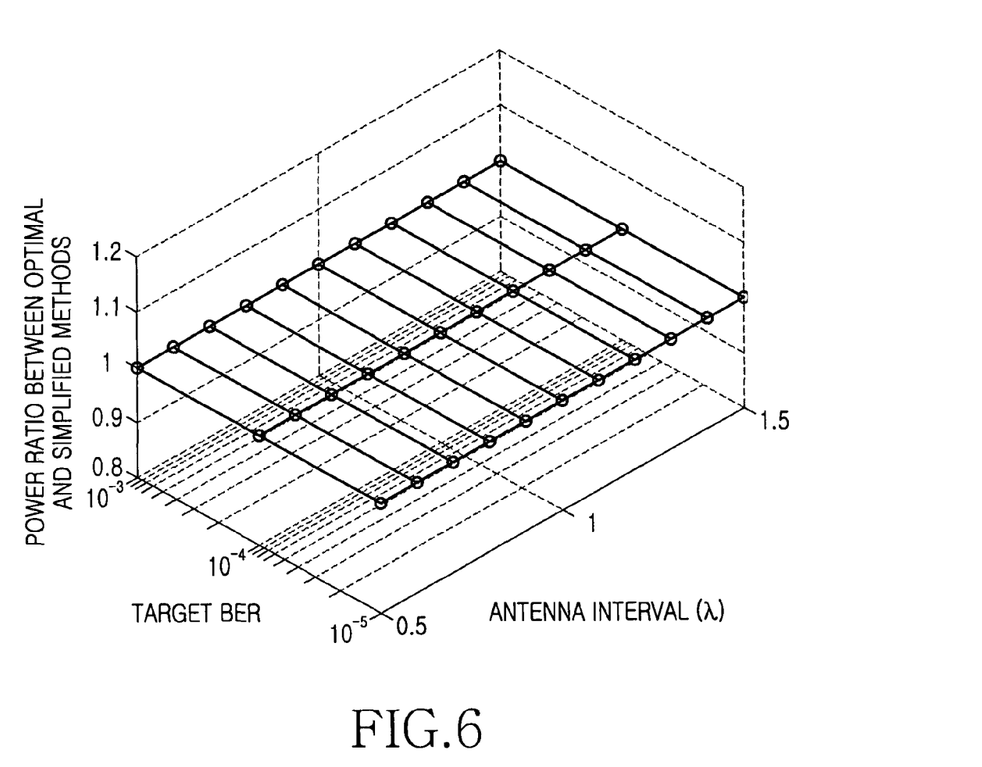
FIG. 6 illustrates an example of a performance comparison between the simplified method and the optimal method in accordance with the present invention.

FIG. 6 illustrates an example of a performance comparison between the simplified method and the optimal method in accordance with the present invention.

In FIG. 6, an antenna interval is 0.5~1.5λ and a target bit error rate is $10^{-3}$~$10^{-5}$. Transmission powers required by the two methods have been compared. As seen from simulation results, a ratio between the transmission powers required by the two methods is 1. The simplified method of the two methods can obtain the same result as the optimal method in a large range.

The DWCS can implement a future oriented wireless communication system structure. Distributed antennas are distributed in different positions and provide users with service by combining and processing information between the distributed antennas. In the distributed system, it is an essential step to determine a service method and the number of antennas for a service to be provided to a mobile station. In particular, when a transmitter knows characteristics of channel statistics but does not know instantaneous characteristic states in the distributed system, to the mode of selecting optimal antennas and determining a transmission scheme are issues to be addressed.

In the MIMO system of the present invention, an apparatus and method for antenna selection, power allocation and code rate control is applied to a DWCS with a clustered structure in which several antennas are installed in each position and a DWCS with a fully distributed structure in which one antenna is installed in each position. The antenna selection method determines an optimal antenna set for providing a service to a user. The power allocation and code rate control methods are determined under the antenna set. When bit loading and transmission power control are performed in a spatial reuse MIMO system, antenna channel fading correlation may degrade system performance.

The present invention improves the performance of the spatial reuse MIMO system in which antenna fading correlation is present. In transmission mode of the present invention, code streams have the same bit error rate, thereby satisfying a target bit error rate. Thus, the present invention has a performance gain of about 2 dB in comparison with the existing self-adaptive method. Moreover, the present invention satisfies the feedback requirement of a simplified method having the performance of an optimal method and has low computation complexity. Therefore, the present invention is easily implemented in an actual system.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A transmitter for use in a Multiple-Input Multiple-Output (MIMO) transmission/reception system, comprising:
    a serial-to-parallel converter for converting an input information bit stream into a plurality of antenna sets information fed back from receivers;
    channel encoders for independently encoding the plurality of antenna sets information;
    constellation mappers for mapping the encoded streams according to a constellation mapping scheme corresponding to constellation mapping scheme information fed back from the receivers and forming modulated data; and
    transmission power controllers for applying different power weights to the modulated data using an available transmission power and the plurality of antenna sets information in the transmission system and transmitting the controlled modulated data via the antennas.

2. The transmitter of claim 1, wherein the transmission power is controlled by different power weights to the received modulated data on the basis of reception power information mapped to the transmission power information from the transmission scheme selection device.

3. The transmitter of claim 1, wherein the transmitter determines the constellation mapping scheme.

4. The transmitter of claim 1, wherein the transmitter determines the available transmission power.

5. A transmitter for use in a Multiple-Input Multiple-Output (MIMO) transmission/reception system, comprising:
    a channel encoder, having one original information input terminal, for channel encoding an original information bit stream input through the input terminal;
    a serial-to-parallel converter for converting the encoded original information bit stream into multiple parallel sub code streams according to antenna set information fed back from a receiver;
    constellation mappers for constellation mapping the sub code streams according to a constellation mapping scheme corresponding to constellation mapping scheme information fed back from the receiver and forming modulated data; and
    transmission power controllers for applying different power weights to the formed modulated data according to transmission power information and transmitting the modulated data to the receiver via antennas.

6. A transmission method for use in a Multiple-Input Multiple-Output (MIMO) transmission/reception system, comprising:
    distributing an input original information bit stream into multiple parallel sub code streams according to antenna set information fed back from a receiver;
    independently channel encoding the distributed sub code streams;
    constellation mapping the independently channel encoded streams according to a constellation mapping scheme corresponding to constellation mapping scheme information fed back from the receiver and forming modulated data; and
    applying different power weights to the formed modulated data according to transmission power information and transmitting the modulated data to the receiver via antennas.

7. A transmission method for use in a self-adaptive Multiple-Input Multiple-Output (MIMO) transmission/reception system, comprising:
    channel encoding an original information bit stream input through one original information input terminal;
    distributing the encoded original information bit stream into multiple parallel sub code streams according to antenna set information fed back from a receiver;
    constellation mapping the distributed sub code streams according to a constellation mapping scheme corresponding to constellation mapping scheme information fed back from the receiver and forming modulated data; and
    applying different power weights to the formed modulated data according to transmission power information and transmitting the modulated data to the receiver via antennas.

* * * * *